United States Patent

[11] 3,598,911

[72] Inventor Walter A. Helbig
Woodland Hills, Calif.
[21] Appl. No. 763,105
[22] Filed Sept. 27, 1968
[45] Patented Aug. 10, 1971
[73] Assignee RCA Corporation
New York, N.Y.

[54] CIRCULATING MEMORY-REFRESHED DISPLAY SYSTEM
16 Claims, 10 Drawing Figs.

[52] U.S. Cl. 178/6.8, 340/324 A
[51] Int. Cl. H04n 5/76
[50] Field of Search 178/6.8; 340/324.1

[56] References Cited
UNITED STATES PATENTS

| | | | |
|---|---|---|---|
| 3,336,587 | 8/1967 | Brown | 178/6.8 X |
| 3,345,458 | 10/1967 | Cole et al. | 178/6.8 |
| 3,423,749 | 1/1969 | Newcomb | 178/6.8 X |
| 3,428,851 | 2/1969 | Greenblum | 315/19 |
| 3,497,613 | 2/1970 | Botjer et al. | 178/6.8 |

*Primary Examiner*—Robert L. Griffin
*Assistant Examiner*—Richard K. Eckert, Jr.
*Attorney*—H. Christoffersen

ABSTRACT: Delay-line-refreshed video display system. The display, a television receiver, is locked to a stable clock frequency source, however, the information from which the video signals are derived arrive from the delay line memory at times which are not necessarily synchronous with this frequency. Means, including logic circuits and temporary storage circuits, derive from this asynchronous data the synchronous information required by the television display.

INVENTOR
WALTER A. HELBIG
BY Samuel Cohen
ATTORNEY

PATENTED AUG 10 1971 3,598,911

SHEET 2 OF 8

INVENTOR
WALTER A. HELBIG
BY Samuel Cohen
ATTORNEY

INVENTOR
WALTER A. HELBIG
BY
ATTORNEY

INVENTOR
WALTER A. HELBIG
BY [signature]
ATTORNEY

INVENTOR
WALTER A. HELBIG
BY [signature]
ATTORNEY

Inventor:
WALTER A. HELBIG
BY
ATTORNEY

INVENTOR
WALTER A. HELBIG
BY [signature]
ATTORNEY

ONCE AROUND OUTER LOOP = 262 1/2 SCAN LINE INTERVALS = THE COMPLETE PERIOD DURING WHICH THE CONTENTS OF THE DELAY LINE MEMORY RECIRCULATES ONCE.

INVENTOR
WALTER A. HELBIG
BY Samuel Cohen
ATTORNEY

CIRCULATING MEMORY-REFRESHED DISPLAY SYSTEM

BACKGROUND OF THE INVENTION

In a display system which includes a cathode-ray tube without storage properties for, for example, displaying letters, numbers, symbols, and the like supplied by a source such as a digital computer, a memory must be employed for "refreshing" the display. The memory continuously supplies the information to the display system in a repetitive manner to cause the visual image cyclically to be recreated.

If in a system of the above type, the display can be made to operate at any frequency desired, the memory can run at its own speed, in asynchronous fashion, and the circuits in the display which generate the sweep and other timing waveforms readily can be made to follow the operation of the memory. In such a system, a relatively inexpensive recirculating memory such as a delay line may be employed or a more expensive, nonrecirculating memory such as a core memory, a semiconductor memory or other memory may be used instead. However, asynchronous display systems are not readily available and if they were, they would be expensive.

If the circuits of a display are synchronous to some external frequency source, such as is the case in a conventional television receiver where the sweep and other timing waveforms are all derived from the power line frequency, then the problem of what type of memory to use becomes more serious. An ordinary (inexpensive) recirculating memory such as a delay line does not appear to be practical, as the delay it introduces readily can and usually does change from field-to-field and frame-to-frame. This, at best, causes flicker and, at worst, renders the display of information unintelligible. For this reason, the known systems of this type employ either a core memory (which is relatively expensive) or a very accurate (and expensive) delay line which introduces an amount of delay to the signal it is storing which is synchronous with the operating frequencies of the display, and which remains fixed regardless of variations in temperature or other parameters.

Cost, of course, is an important factor in many aspects of the computer business. In many large systems which employ large numbers of display "terminals" such as computer-controlled instructional systems, time-shared computer systems, and other similar systems, the cost of the system could be reduced substantially if the cost of the individual terminals could be reduced. This is accomplished in the present invention by employing mass produced and therefore relatively inexpensive display means of the synchronous type, such as commercial television receivers and relatively inexpensive refresh memories, such as delay lines which are subject to drift, and ingenuously interconnecting them in such a way that the changing delay introduced by the delay line does not adversely affect the image which is displayed.

SUMMARY OF THE INVENTION

The system of the invention includes a display means such as a television receiver which derives its timing waveforms from a stable frequency source. A circulating memory subject to drift supplies the signals from which are derived the modulation signals for creating and continuously refreshing the image on the screen of the display means. Means controlled by the stable frequency source and receptive of the signals provided by the circulating memory derives therefrom signals which are synchronous with the timing waveforms of the display means. From these signals are derived the modulation signals for the display means and these signals are also returned to the circulating memory at a time such that they begin again to be supplied by the memory approximately one display means field time later.

DETAILED DESCRIPTION

CONVENTIONS

In the system of the invention, electrical signals indicative of binary digits (bits) are applied to and obtained from various of the logic gates or other circuit elements. For the sake of brevity in the discussion which follows, the bits themselves are sometimes referred to rather than the signals manifesting the bits. These signals are sometimes identified by a group of letters or numbers. For example, in FIG. 3, DL2D at the upper left identifies a signal which represents a binary digit and which, in fact, is the data signal received from the delay line memory. Sometimes a group of letters is followed by a dash, followed by a P or an N. The letter P means that when the signal represents the binary digit 1, it is positive and the letter N means that when the signal represents the binary digit 1, it is negative. Where the meaning is clear, sometimes the P or the N are omitted.

Figure 3:
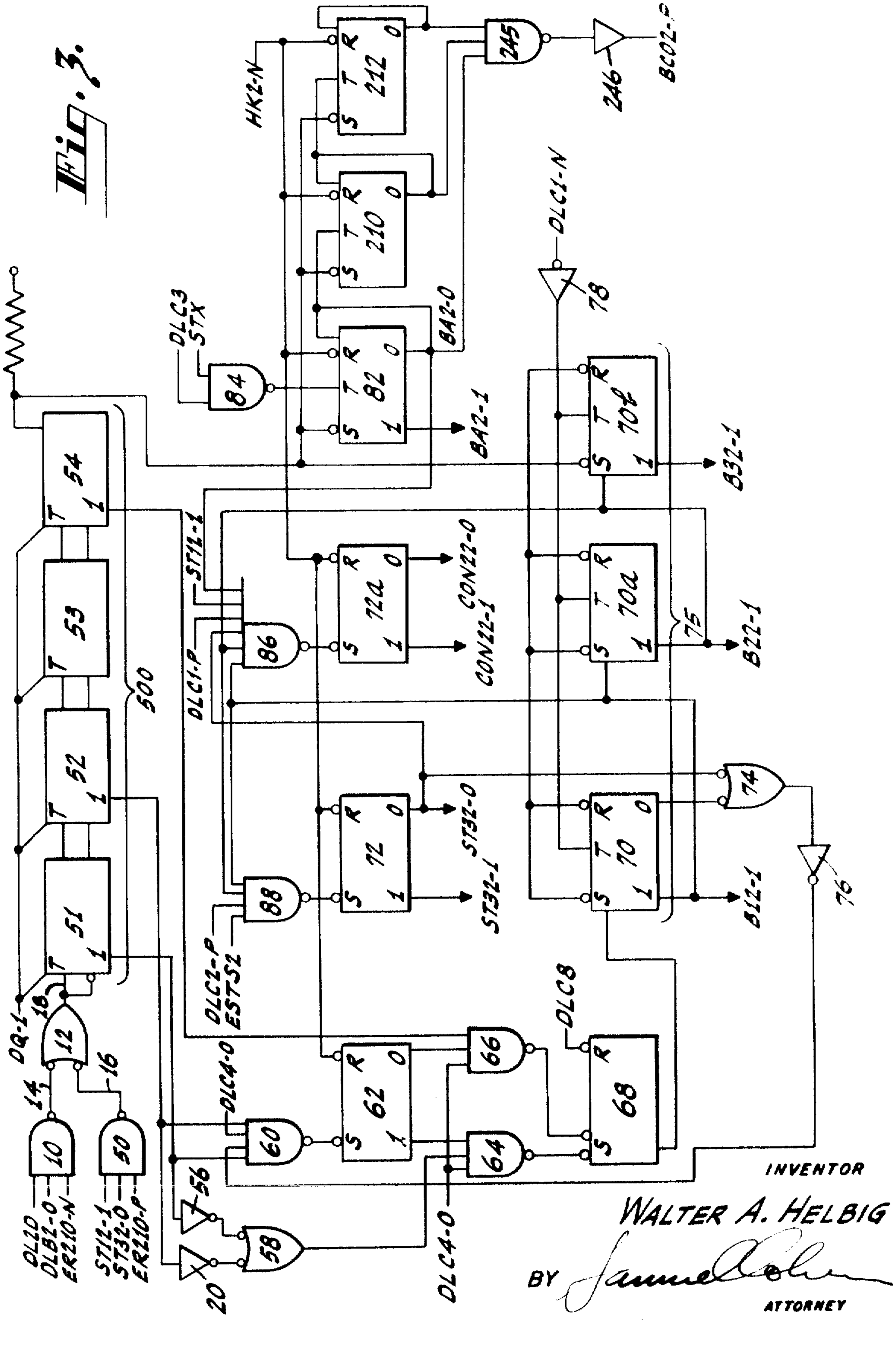
FIGS. 3, 4a, 4b and 5 are more detailed block diagrams of the synchronizing circuits and other circuits of FIG. 1.

The logic gates may be considered to be AND gates and OR gates. The gates with the rounded ends such as gate 10 at the upper left of FIG. 3, are AND gates. The circle which is present at the rounded, that is, the output end of the gate means that the signal produced is relatively negative when it represents the bit 1. For a gate such as 10 when there are three relatively positive signals present at the input, a relatively negative signal is produced at the output. At other times, a relatively positive level is present at the output.

A gate with a pointed end such as 12 in FIG. 3 can be considered to be an OR gate. Here, the two circles at the input to the gate mean that a signal representing a 1, when it is present, is relatively negative. The absence of a circle at the output of gate 12 means that the signal representing a 1, when it is present, is relatively positive. Thus in the operation of gate 12, when either of its two inputs represent a 1, that is, when the signal on lead 14 or the signal on lead 16 is relatively negative, then the output signal at lead 18 is relatively positive. At other times, the output level of gate 12 is relatively negative.

The triangles in the figures represent amplifiers which may perform a signal polarity inversion function. For example, the circuit element 20 at the upper left of FIG. 3, when it receives a positive-going signal produces a negative-going signal at its output. However, in logical terms, a positive-going signal at the input to this particular inverter represents a 1 and a negative-going signal at the output of the inverter also represents a 1.

The rectangles in the figures which are identified only by a number or number and letter, within the rectangle represent flip-flops. The letters S and R represent the set and the reset terminals of the flip-flops and letter T represents the trigger terminal of a triggerable flip-flop. The numbers 1 and 0 represent the two outputs produced by a flip-flop, one complementary to the other. In general, wnen a flip-flop is set, a signal representing a 1 appears at its 1 output terminal and a signal representing 0 appears at its 0 output terminal and when the flip-flop is reset, a signal representing a 1 appears at its 0 output terminal and a signal representing a 0 at its 1 output terminal.

In some cases, the line defining the input side of a gate is extended beyond the boundaries of the gate. The signal applied to this extension of the gate can be thought of as being applied directly to the gate. (See, for example, gate 22 at the lower left part of FIG. 4*a*, which gate receives four signals.)

FIGURE 1

Figure 1:
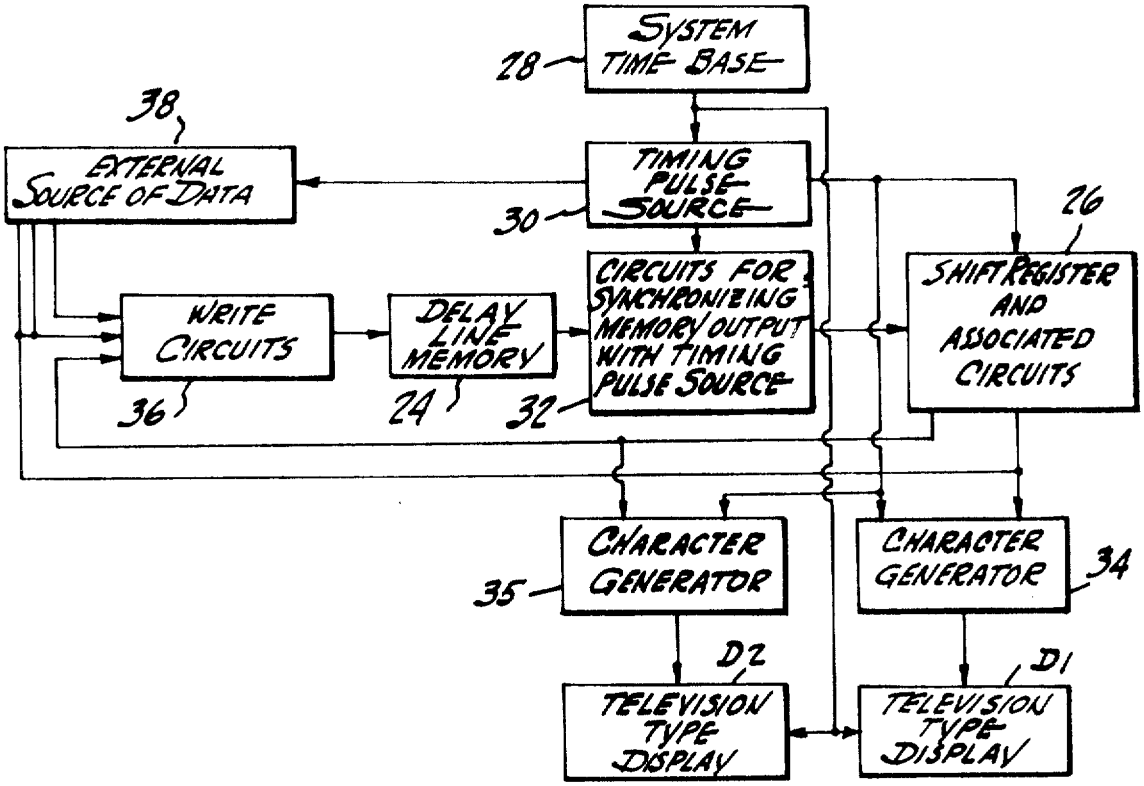
FIG. 1 is a block diagram of one form of system according to the invention.

The major subsystems of the present invention are shown in FIG. 1. The circulating memory 24 is a relatively inexpensive magnetostrictive delay line which includes the input and output amplifiers for increasing, in the required amount, the level of power of the signals applied to and received from the delay line. In reasonably large quantities, such delay lines cost $150.00 each, or less. Unfortunately, delay lines in this price range are not temperature compensated and the delay introduced by any delay line chosen for one system may not be precisely the same as that of the delay line for a different system. The delay line memory 24 is sufficiently long to store two complete fields of the information it is desired to display on the screens of two conventional television receivers (one field for each receiver).

In one system according to the invention, it is desired to display 16 rows of characters on each television screen, each row occupying 14 horizontal scan lines on its screen. Each row of characters consists of 32 information characters which are displayed and one control character which is not displayed. The latter is hereafter termed a "Bell code" and its purpose is to signal the end of one row and the start of the next row. The delay line therefore stores 33 characters times 32 rows (16 rows for each display) or 1056 characters.

Each character s stored in the delay line memory as an eight-bit code. Seven of the bits represent information and the eighth bit is a parity bit. The code employed may be the well-known ASCII code. To simplify the discussion which follows, the parity bit, in some cases, is not referred to specifically.

A binary digit in the delay line memory is located within a time interval of roughly 1.25 microseconds (actually 1.241 microseconds). This time interval is hereafter termed a bit time. However, the actual duration within this time interval of a binary digit is 0.5 microseconds. Thus, for each eight bit character stored in the delay line, the time equivalent of $8\times1.25$ microseconds $\cong$ 10 (actually 9.928) microseconds must be allotted.

A conventional television type display such as D1 or D2 employs two fields which are interlaced to make up one frame. Only a single field of information for each display is generated each time data is read from the delay line memory 24. After the data is used to generate its image for the first field on the screen of each television display, it is returned to the delay line memory and when it becomes available again, this same data is used to generate its image for a second field on the display which is interlaced with the first field to provide, on each display, one frame to display information. .The information displayed on the two television receivers D1 and D2, in general, will be different—for example, two different lessons of an educational program.

The system of FIG. 1 is locked to the system time base frequency provided by source 28. This, for example, may be the 60-cycle power line source. The television-type displays D1 and D2 include circuits which produce the necessary sweep waveforms and other timing waveforms which are synchronous with 60 cycle.

The timing pulse source 30 includes a stable oscillator which is also synchronized with the system time base. For purposes of the present explanation, the timing source 30 may be considered to produce the various timing and control voltages which will be discussed at length later. A number of these waves are applied to the circuits 32 whose purpose is to synchronize the information read from delay line memory 24 with the system time base. The present invention is mainly concerned with the circuits within blocks 26 and 32 and they are illustrated in FIGS. 3—5 and discussed at length later.

The synchronized information derived from the delay line memory is placed in the shift register within block 26 for a short interval of time and is transferred from the shift register to the character generator 34. The latter retains the information it receives for a length of time sufficient to permit one row of information (14 scan lines) to be written on the screen of one of the television-type displays D1 and D2. Thereafter, the information stored in the character generator 34 is replaced with new information from the shift register 26. During a short interval within the time the character generator 34 is writing information into its display D1, character generator 35 receives information from register 26 for a row of information for its display D2.

After the short interval required for the shift register within block 26 to transfer its information to the character generator 34, it returns the information it is storing to the write circuits 36 which, in turn, apply this information to the delay line memory 24. As the information is being returned to the delay line memory, the latter is supplying new information via the circuits 32 to the shift register within block 26.

It is also possible in the system of the present invention to replace the information in the delay line memory 24 with new and different information. As one example, the information may be replaced with new information supplied by the digital computer of an instructional system. As another example, the information may be modified by new information provided by a keyboard at the student terminal of an instructional system. These various sources are shown generally in FIG. 1 by the block 38, legended "External Source of Data."

Figure 2:
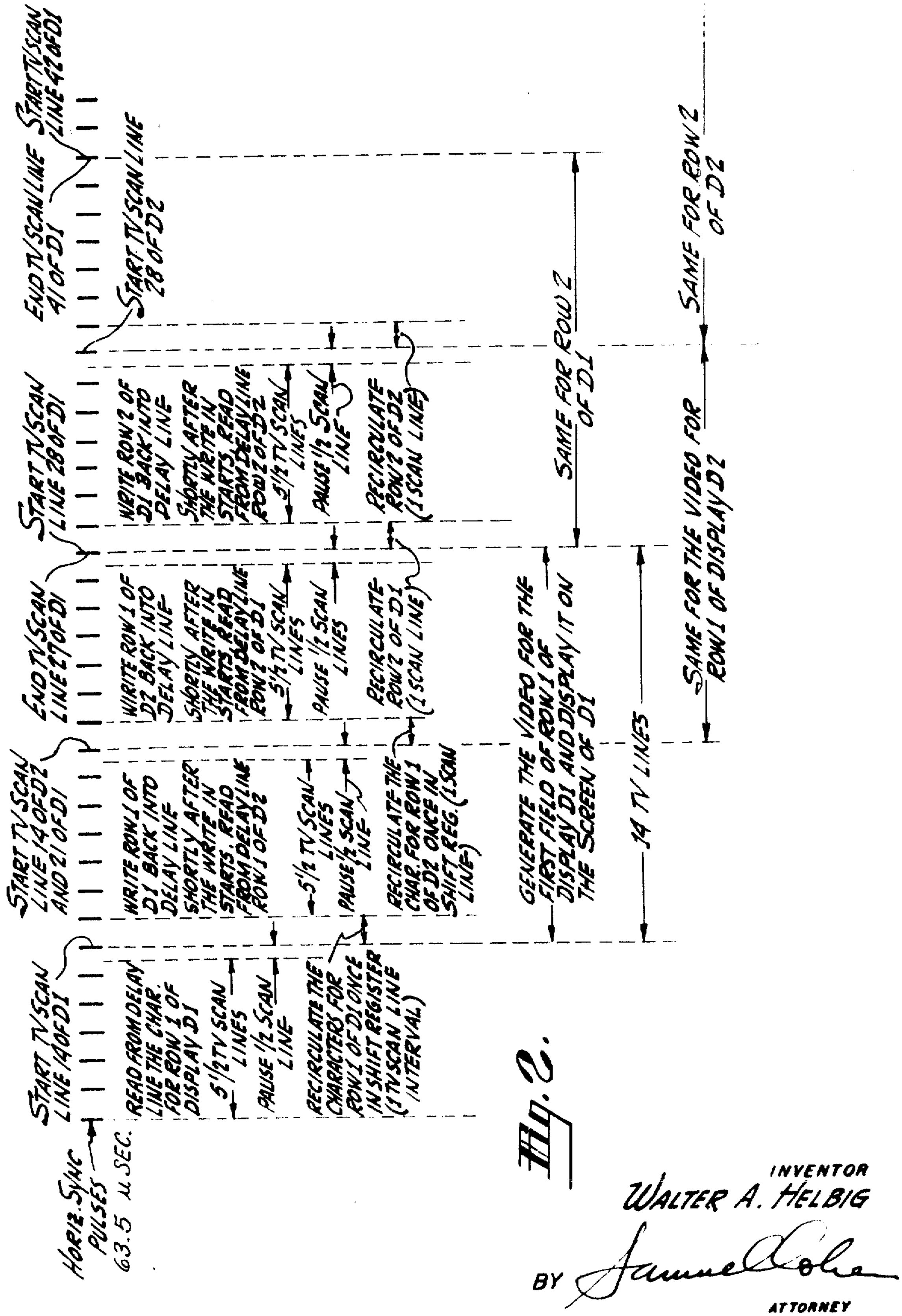
FIG. 2 is a drawing to explain the timing relationship among various operations carried out in the system of FIG. 1.
Figure 9:
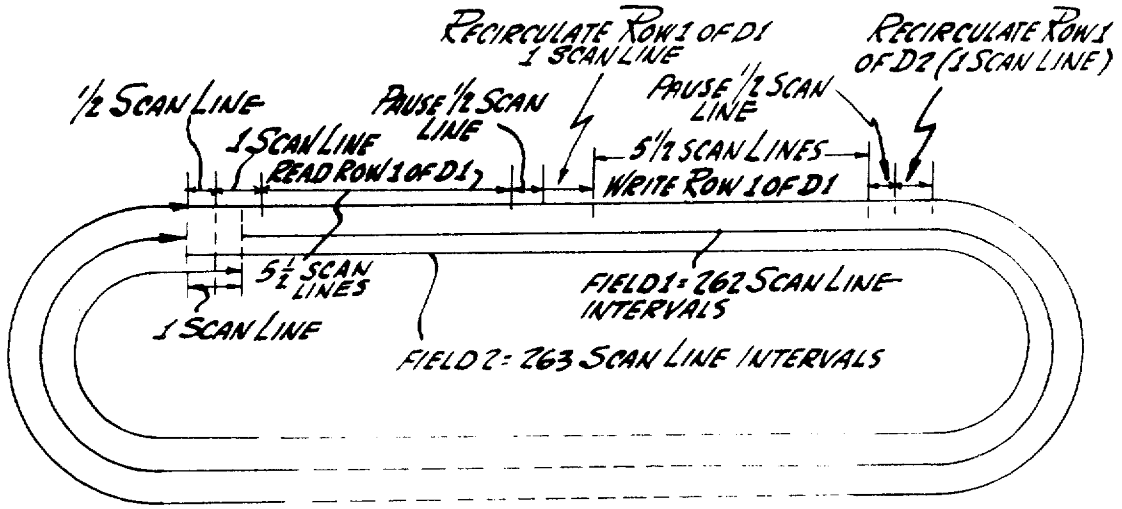
FIG. 9 is another drawing to explain the timing relationship among various operations in the system of FIG. 1.

FIGURES 2 and 9

The timing of various operations of the system of FIG. 1 is illustrated, in part, in FIG. 2. Assume that the delay line memory 24 is supplying information to the shift register 26 through the circuits 32, the shift registers are supplying information to the character generator 34 and back to the delay line memory 24, and the character generators are supplying video information to the television displays D1 and D2. The horizontal synchronizing pulses which are synchronous with the standard frequency of 12.083916 MHz. (megahertz) are shown at the upper part of the figure. These pulses are spaced 63½ microseconds apart, that is, each television scan line has a duration of 63½ microseconds.

To start with, the information necessary for writing the first row of information on display D1 is read out of the memory. As already mentioned, each bit stored in the delay line is located within a bit interval 1.241 microseconds in duration. This means that each eight-bit character occupies the equivalent of 9.928 microseconds of delay line length. Therefore, six and a fraction characters can be read out of the memory during each scan line, that is, during each 63.5 microseconds. In an interval of slightly more than 5 scan lines (5.24 scan lines), the 32 characters to be displayed and the 33rd or Bell code character may be read out of the memory. However, due to drift, the location of these 33 characters is not known precisely and therefore an interval of 5½ scan lines, or about 350 microseconds is allowed for these characters. This is roughly 20 microseconds more than the time occupied by the characters and this allows drift of the characters to the extent of plus or minus about 10 microseconds during their travel through the delay line without leaving the 5½ scan line time "slot."

After the interval equivalent to 5½ scan lines, there is a pause in the system for a half scan line. During the 5½ scan lines, the information passes through the synchronizing circuits to the shift register 26. It can be considered, for purposes of the present explanation, that during the ½-scan-line pause, the information is held without movement or modification in the shift register 26. During the next scan line interval, the information in the shift register within block 26 is applied from the shift register to the character generator 34 and at the same time is recirculated, at high speed, once around the shift register. As will be shown later, the shifting is at an effective rate of 6.041958 megabits per second and it requires only 42.47895 microseconds to complete the ring shift of the 32 characters (256 bits). This 42.48 microsecond interval occurs at roughly the center of the 63.5 microsecond horizontal scan period.

The 32 eight bit characters now present in the character generator 34, are written on the screen of the display D1 as the first row of the display. For purposes of the present discussion, the first row is shown to start on line 14 and in this case the bottom margin between the last or 16th row of the display and the bottom of the television tube will be relatively narrower than 14 lines. (In practice, the top and bottom margin sizes may be different at the different "terminals" and may be more or less than 14). The first row of display D1 occupies 14 television lines so that this is the time during which the character generator performs the conversion from ASCII code to video signals. During the first two television scan lines (lines 14 and 15 of D1, in this example), in general, no video signals are produced so the screen remains blank. This, in general (for the rows following the first row) is part of the space between rows. During the third scan line of a row, the very tops of the characters of the row may be drawn on the screen by intensity modulating the beam of the cathode-ray display tube (kinescope) of the television receiver. During the fourth television scan line, the next portion of the character may be drawn, and so on. During the 13th and 14th lines, the screen again may be left blank to provide part of the space between that row of characters and the following row.

In FIG. 2, the 14-scan-line interval during which row 1 is displayed on the television screen of display D1 is shown to occur between the beginning of its horizontal scan line 14 and the end of its scan line 27. At the time at which scan line 21 starts on display D1, row 1 starts on display D2. It starts at horizontal scan line 14 of display D2. Thus, the last seven lines of row 1 on display D1 are drawn during the same time the first seven lines of row 1 are being drawn on display D2. It can be seen from this that the entire timing of display D2 (including vertical retrace) is the time equivalent of seven horizontal scan lines (444.5 microseconds) behind that of display D1.

Immediately after the information for row 1 of display D1 is recirculated once in the shift register of stage 26, it is started back to the delay line memory 24. The start of the write in is shown to occur seven line times after the start of the time during which this same row is read from the delay line. The delay line inserts a delay equivalent to 255.5 horizontal scan lines. Therefore, this row of information will be present at the output of the delay line 255.5+7 = the time equivalent of 262.5 scan lines after the first readout of this line starts. This delay of 262.5 scan lines is precisely one field time (including the vertical retrace time) for a commercial television receiver so that (ignoring drift in the delay line) each row of information will be properly synchronized with the television display each time it arrives from the delay line. (This drift is compensated for by the circuits in block 32.)

There is a delay of seven scan lines between the time the data is received from the line and the time it is returned to the line as shown in FIG. 2. The actual delay between two periods that the same bits of information are supplied to the character generator 34 from the shift register of stage 26 alternates between 262 and 263 scan lines intervals. This is to insure proper interlace. The way this half scan line (255.5+0.5 and 255.5−0.5trated in FIG. 9.

The "writing" of information into the delay line starts at some precise time coincident with the start of a scan line. The write in of row 1 for display D1 starts at the end of scan line 14 of display D1 and is completed within slightly more than 5 scan line intervals, although a 5½-scan-line interval is allotted to receive this information. During the time this information, that is, the information for row 1 of display D1 is being returned to the delay line memory, the delay line memory is applying output signals for row 1 of display D2 to the shift register 26. Thus, as the information is being taken from one end of the shift register, information for the second television display D2 is being accepted ("read") from the memory at the opposite end of the shift register. The read out of the delay line memory starts a short interval (a small fraction of a scan line) after the start of the writing in of the information to the delay line. All of this is occurring during the time the character generator 34 is writing part of row 1 on display D1.

After the information for row 1 of display D2 is read out of the delay line, there is a half-scan-line interval pause and then the shift register within block 36 sends the information it is storing to the character generator 35 and at the same time, recirculates this information once in the shift register. The recirculation occurs within one scan line interval—during the interval of scan line 21 of display D1.

During the interval between the end of scan line 21 of display D1 and the middle of scan line 27 of display D1, the information for row 1 of display D2 is written from the shift register 26 back into the delay line 24 and the in formation for row 2 of delay line D1 is read from the delay line memory into the shift registers of 26.

At a time corresponding to the start of television scan line 21 of display D1, the character generator 35 starts writing row 1 of display D2 into television display D2. This requires 14 scan lines, that is, lines 14 through 27 of display D2. (Note again that line 14 of D2 is concurrent with line 21 of D1.) During this interval, lines 21 through 27 of row 1 and lines 28 through 34 of row 2, both of display D1, are being drawn on the screen of display D1.

The precess described above continues until one entire field of characters (14 rows line × 16 rows = 224 lines) are written on each display D1 and D2. In the delay line, each row of information is located within a time interval having the duration of only seven scan line periods so that the 32 rows require a delay line length equivalent to 32×7=224 television scan line periods or 14,224 microseconds. The actual line length is the time equivalent of 255.5 scan line periods. The difference—21.5 scan line periods plus the approximately 7-scan-line delay introduced in stage 26 is to permit sufficient time for vertical retrace of the displays and for the top and bottom margins of the displays.

After the first field is written on each display and after the delay necessary for vertical retrace and margins has elapsed, the system applies to each display another field timed to interlace with the first field to provide one complete frame of each display. The second field for a display is, of course, the same field already applied once to that display. This refresh process automatically repeats for as long as desired. The information displayed can, however, be changed by erasing (removing) the old information in the delay line and replacing it with new information. This new information may be supplied by the data processing machine within source 38.

The table which follows illustrates the timing discussed above. FIG. 9 also illustrates this timing in a more schematic way.

SYNCHRONIZATION CIRCUITS

FIG. 3 shows a number of the circuits for synchronizing information received from the delay line with the central time base of the system. The input from the delay line is the signal DL2D at the upper left which is one input to AND gate 10. It may be assumed for the present that the remaining two inputs to the AND gate 10, that is DLB2–O and ER210–N both represent the bit 1. Both of these signals may be considered as coming from the control area of the system. The DLB2–O signal indicates to the system that it is time to receive information from the delay line. The ER210–N signal is an indication that it is not desired to erase the information stored in the delay line.

The AND gate 50 is disabled during the time information is being received from the delay line. One reason is that the ER210–P signal, which is complementary to the ER210–N signal, represents the bit 0. The remaining two signals at the input of AND gate 50 will be discussed later. The output of AND gate 10, when one is present, is applied through OR gate 12 to the four-stage register 500 which consists of flip-flops Delay line periods (63.5 μs. per period) | Read: Row, For display | Write: Row, For display | Display: D1, Scan lines, D2, Scan lines

| Delay line periods (63.5 μs. per period) | Read Row | Read For display | Write Row | Write For display | Display D1 | Display Scan lines | Display D2 | Display Scan lines |
|---|---|---|---|---|---|---|---|---|
| 1-7 | 1 | D1 | | | Blank | 8-14 | | |
| 8-14 | 1 | D2 | 1 | D1 | | | Blank | 1-14 |
| 15-21 | 2 | D1 | 1 | D2 | Row 1 | 15-28 | | |
| 22-28 | 2 | D2 | 2 | D1 | | | Row 1 | 15-28 |
| 29-35 | 3 | D1 | 2 | D2 | Row 2 | 29-42 | | |
| 36-42 | 3 | D2 | 3 | D1 | | | Row 2 | 29-42 |
| 43-49 | 4 | D1 | 3 | D2 | Row 3 | 43-56 | | |
| 50-56 | 4 | D2 | 4 | D1 | | | Row 3 | 43-56 |
| 57-63 | 5 | D1 | 4 | D2 | Row 4 | 57-70 | | |
| 64-70 | 5 | D2 | 5 | D1 | | | Row 4 | |
| 71-77 | 6 | D1 | 5 | D2 | Row 5 | 71-84 | | |
| 78-84 | 6 | D2 | 6 | D1 | | | Row 5 | |
| 85-91 | 7 | D1 | 6 | D2 | Row 6 | 85-98 | | |
| 92-98 | 7 | D2 | 7 | D1 | | | Row 6 | |
| 99-105 | 8 | D1 | 7 | D2 | Row 7 | 99-112 | | |
| 106-112 | 8 | D2 | 8 | D1 | | | Row 7 | |
| 113-119 | 9 | D1 | 8 | D2 | Row 8 | 113-126 | | |
| 120-126 | 9 | D2 | 9 | D1 | | | Row 8 | |
| 127-133 | 10 | D1 | 9 | D2 | Row 9 | 127-140 | | |
| 134-140 | 10 | D2 | 10 | D1 | | | Row 9 | |
| 141-147 | 11 | D1 | 10 | D2 | Row 10 | 141-154 | | |
| 148-154 | 11 | D2 | 11 | D1 | | | Row 10 | |
| 155-161 | 12 | D1 | 11 | D2 | Row 11 | 155-168 | | |
| 162-168 | 12 | D2 | 12 | D1 | | | Row 11 | |
| 169-175 | 13 | D1 | 12 | D2 | Row 12 | 169-182 | | |
| 176-182 | 13 | D2 | 13 | D1 | | | Row 12 | |
| 183-189 | 14 | D1 | 13 | D2 | Row 13 | 183-196 | | |
| 190-196 | 14 | D2 | 14 | D1 | | | Row 13 | |
| 197-203 | 15 | D1 | 14 | D2 | Row 14 | 197-210 | | |
| 204-210 | 15 | D2 | 15 | D1 | | | Row 14 | |
| 211-217 | 16 | D1 | 15 | D2 | Row 15 | 211-224 | | |
| 218-224 | 16 | D2 | 16 | D1 | | | Row 15 | 211-224 |
| 225-231 | | | 16 | D2 | Row 16 | 225-238 | | |
| 232-238 | | | | | | | Row 16 | 225-238 |
| 239-255½ | | | | | Blank and VERT retrace | 239-262½ | | |
| 255½-262 | | | | | | | Blank and VERT retrace | 239-262½ |
| | | | | | Blank | 1-7 | | |

REPEAT STARTING AT DELAY LINE PERIOD 1 AND ENDING CYCLE AT 263 LINE TIMES

51–54, respectively. The information stored in the flip-flop is advanced by the signal DQ–1 (see FIG. 7). The wave DQ–1 which may be derived from the clock pulses can be considered to consist of 15 half periods $X_1$ through $X_{15}$. During the first two half periods, $X_1$ and $X_2$, the wave represents the bit 0 and thereafter it alternates between representing the bit 1 and the bit 0. Each time DQ–1 represents a 1, the information stored the the shift register 50 is advanced one stage.

It has already been mentioned that a bit in the delay line occupies a delay line length equivalent to 0.5 microseconds. This is substantially longer than the roughly 0.16 microsecond period of the shift wave DQ–1. Thus, in response to a single 1 from the delay line, the shift register 500, during successive periods, may store the successive words 1000, 1100, 1110, 0111, 0001 and 0000.

The 1 output terminals of the first two stages 51 and 52 of register 500 are connected through inverters 20 and 56 to OR gate 58 and are also connected to input terminals to AND gate 60. AND gate 60 is connected to the set terminal of flip-flop 62 and OR gate 58 applies its output to one input to AND gate 64. The 1 output terminal of the fourth flip-flop 54 of the register 500 is connected to one input terminal to AND gate 66. AND gates 64 and 66 are connected to the set input terminal of flip-flop 68 which may be termed the "data bit" flip-flop.

Figure 6:
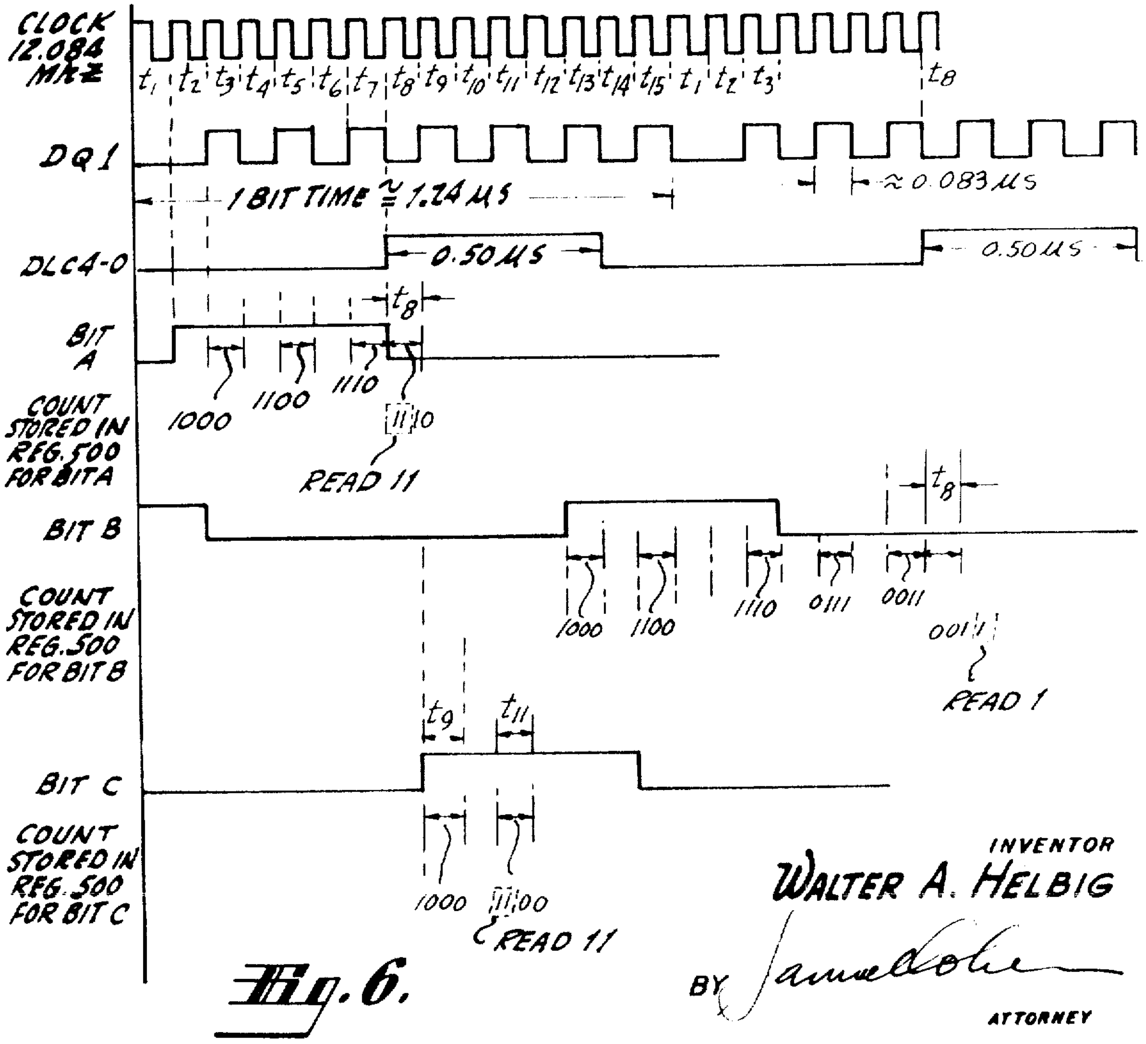
FIG. 6 is a drawing of waveforms to help explain the operation of certain of the circuits of FIG. 3.

The operation of the arrangement as discussed so far is depicted in FIG. 6. Assume that a bit legended bit A, starts arriving at the register 50 at the beginning of the time interval $t_2$. It may be assumed for the present that this bit is the first bit of the Bell code (00000111) for the 256 data bits which together define the 32 eight-bit characters for one row of information.

As the delay line employed is a relatively inexpensive delay line and not very accurate, one cannot be certain at which time the bit A will arrive from the delay line. If it arrives at the time shown, the shift register 500 stores the successive counts 1000, 1100, 1110, during the periods $t_3$, $t_5$ and $t_7$ of the clock and the corresponding half periods of the shift wave DQ–1.

During the next half period $t_8$ of the shift wave DQ–1, the enabling signal DLC4–O changes from 1 to 1. During this same half period, the count 1110 is stored in the register 500. Accordingly, three of the four inputs to AND gate 60 represent the bit 1. During the same period, flip-flop 70 at the lower part of the figure is reset, as is flip-flop 72. Therefore, the 0 outputs of flip-flops 70 and 72 are both relatively positive so that OR gate 74 produces a relatively negative output representing the bit 0. Inverter 76 therefore produces a relatively positive output representing the bit 1. This 1 is the fourth input to AND gate 60 so that AND gate 60 is enabled and sets flip-flop 62.

OR gate 58 is also enabled and produces an output representing a 1. Thus AND gate 64 becomes enabled and it sets flip-flop 68.

All of the above occurs during the time interval $t_8$, even though the bit A arrived during the time interval extending from $t_2$ through $t_7$. The following seven bits of the Bell code and 256 bits of data in the delay line will also be clocked into the data bit flip-flop 68 at corresponding times $t_8$ of the following periods of DQ–1. (The assumption is made and this has been found to be the case in practice, that during the relatively short interval (5+ scan lines) for one row of information in the delay line, there is no substantial drift of a bit of one character relative to a bit of any other character.) Thereafter, these bits will be synchronized with the trigger pulse DLC1 (see FIG. 7) for the three-bit shift register 75 consisting of stages 70, 70*a* and 70*b*.

Assume now that the first bit is bit B (FIG. 6) and it arrives during the time interval $t_{13}$ through $t_3$. Now, during the following time interval $t_8$ when the synchronizing pulse DLC4 changes from 0 to 1, the number 0011 is stored in register 500. Therefore, AND gate 60 remains disabled and flip-flop 62 remains reset. However, the the 1 present in stage 54 of the register 500 passes through AND gate 66 and sets flip-flop 68. Therefore, even though the data bit B arrived in the period $t_{13}$ through $t_3$, it is clocked into the data bit flip-flop 68 during the period $t_8$. In a similar fashion, during the following periods $t_8$, the following 255 bits for a row will be clocked into the data bit flip-flop 68.

As a third example, assume the first bit is bit C (FIG. 6) and it arrives during the period extending from $t_9$ through $t_{14}$. Now during the period $t_9$, the register 500 will store 1000 and during the period $t_{11}$, the register 500 will store 1100. In response to the 11, registers 62 and 68 become set in the manner already discussed. During each following time interval $t_{11}$, the following bits coming from the delay line will be clocked into the data bit flip-flop 68.

The trigger pulse DLC1–N (FIG. 7) is applied through inverter 78 to the trigger terminal of register 75. This trigger pulse has a duration of approximately 0.083 microseconds and occurs once every bit interval, that is once every 1.241 microseconds. This trigger pulse causes the successive bits stored in the data bit flip-flop 68 to be shifted into the shift register 75 and after each such shift, the reset pulse DLC8 clears stage 68. Thus if the first three bits which arrive from the delay line are 111, after three trigger pulses DLC1–N, these three bits will be stored in register 75 as 111, where the most significant bit is stored in stage 70 and the least significant bit in stage 70*b*. At this point in time, the bits are synchronized with DLC1–N regardless of where within a 1.241 microsecond bit time they happen to arrive from the delay line. It might also be mentioned that as soon as the first flip-flop 70 becomes set, the OR gate 74 and inverter 76 disable AND gate 60 so that the flip-flop 62 remains in whatever state it happens to be, either set or reset. Shortly thereafter, flip-flop 72 becomes set and remains set for the entire row interval. This disables AND gate 60 via 74 and 76 for the entire row interval.

Figure 4A:
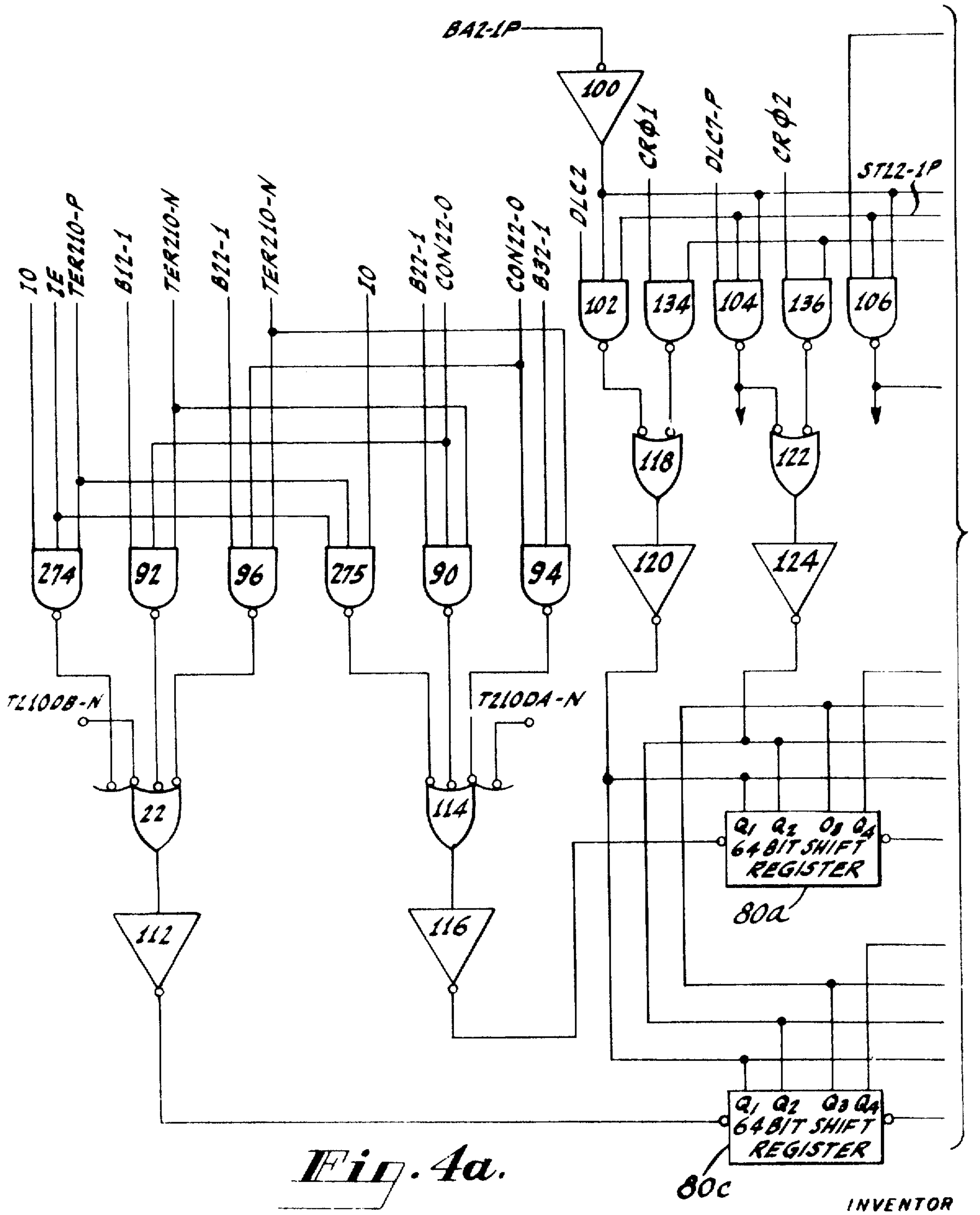
Figure 4B:
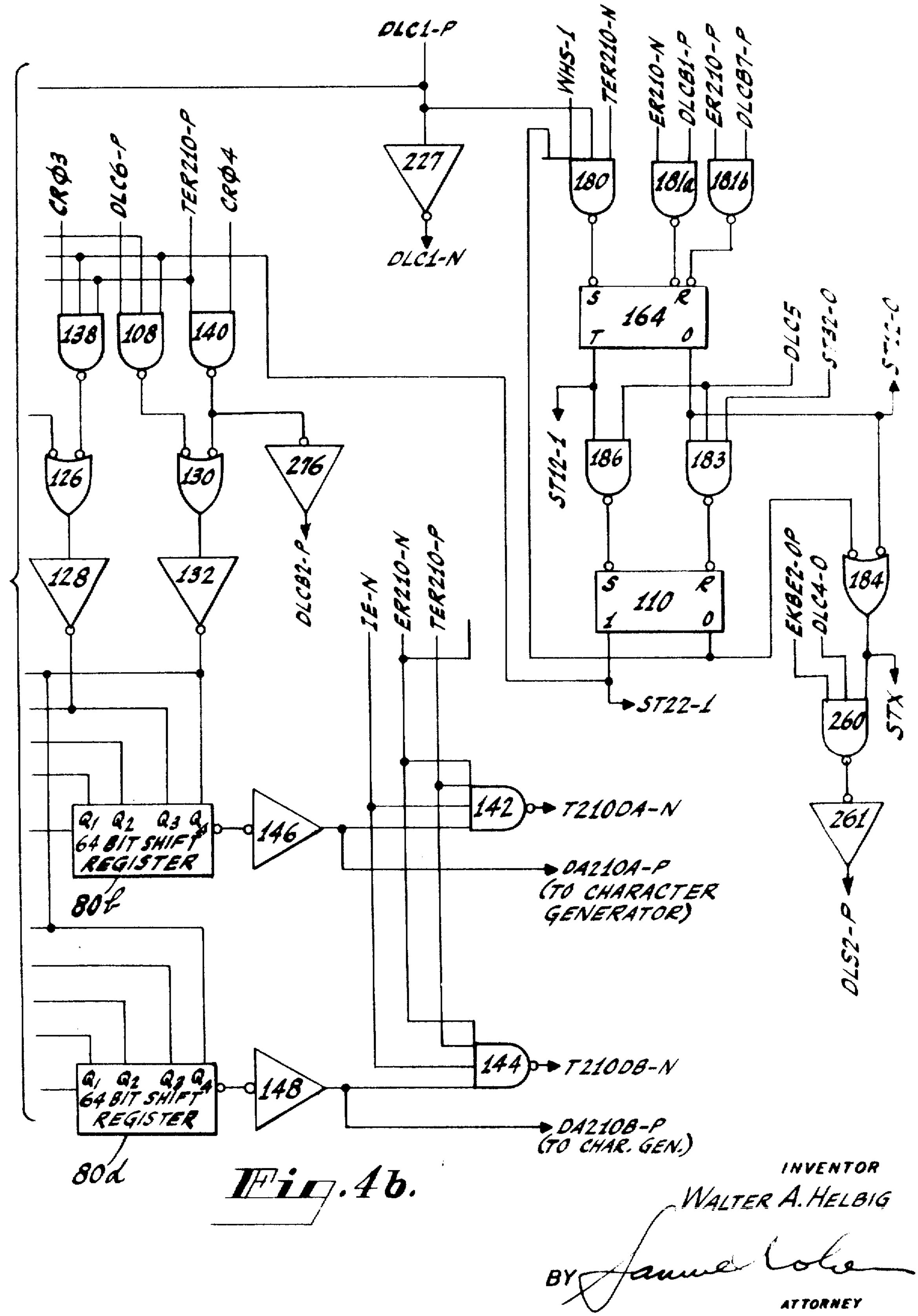
Figure 5:
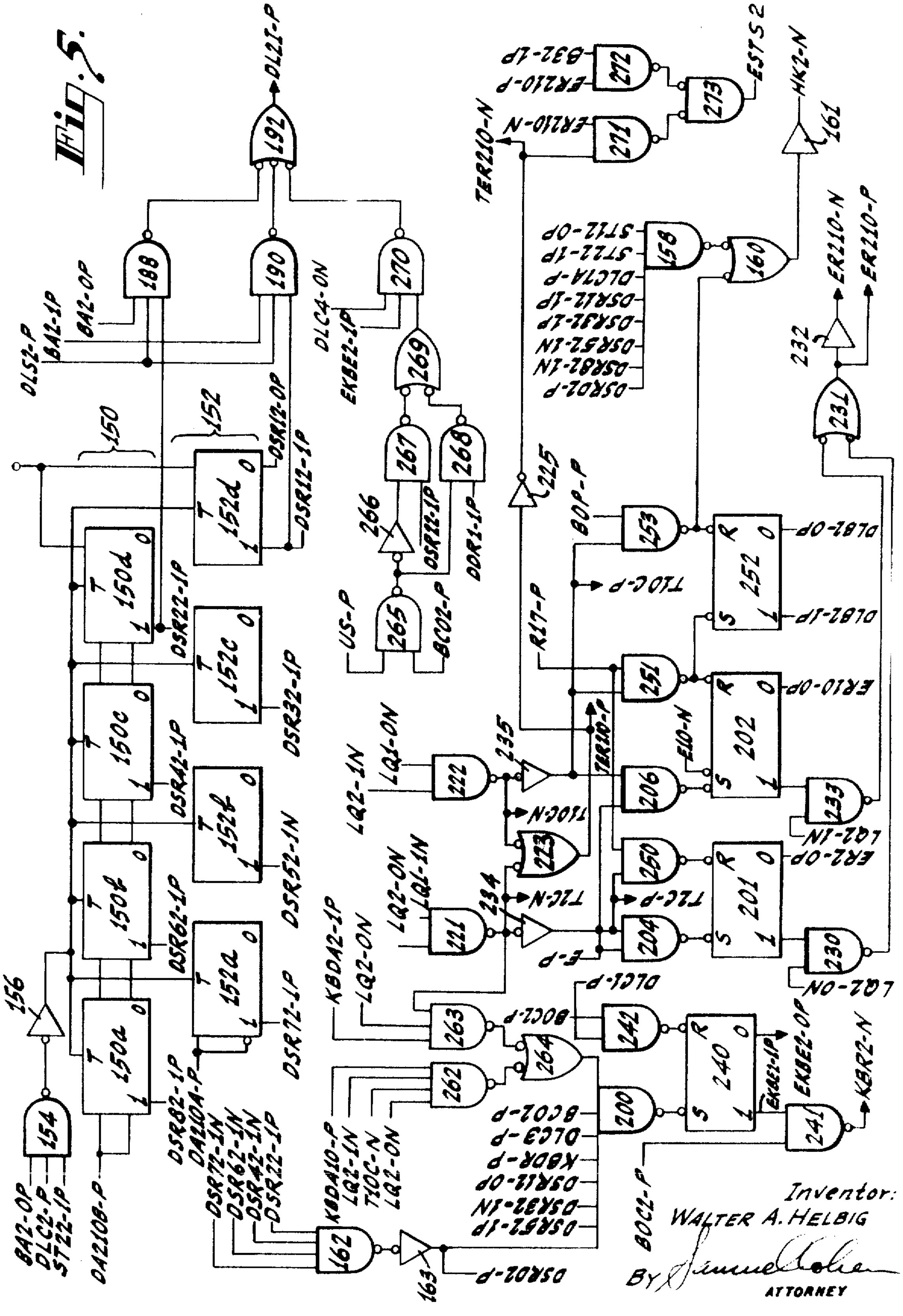

The information present in register 75 is transferred two bits at a time to a 256-bit shift register shown as four stages 80*a*—80*d* in FIGS. 4*a* and 4*b*. Each of the stages stores 64 bits and the two stages 80*a* and 80*b* act as half of the shift register and the two stages 80*c* and 80*d*, as the other half of the shift register. The operation of this shift register will be discussed shortly.

For reasons which will become clear shortly, it is necessary to determine which two of the three stages of shift register 75 (FIG. 3) will be sampled. It is possible to read out B12–1 and B22–1 (from stages 70 and 70*a*) or B22–1 and B32–1 (from stages 70*a* and 70*b*). The stages which are selected will depend upon the condition of flip-flop 82 and the reason that one pair or the other of the outputs of register 75 is selected is to insure that they are placed in the correct stages of the shift register 80, that is the odd or the even stages, as will be discussed shortly.

The flip-flop 82 is known as the bit alternator flip-flop. If it is assumed for the present that the input STX to AND gate 84 normally represents a 1, then each time DLC3=1 occurs, he flip-flop 82 will change its state. As may be seen from FIG. 7, DLC3 is an 0.08275 microsecond pulse and it occurs each 1.241 microseconds, that is, once each bit time.

Assume now that the initial bits of a row have been received from the delay line, have been successively placed in the data bit flip-flop 68 and have been successively shifted into the three-bit register 75. Assuming that the first two bits received are both 1, after two-bit times, this 1 is present in stages 70 and 70*a* of register 75. Assume now that DLC1–P represents a 1 and that ST12–1 also represents a 1. These two signals are two of the six inputs to AND gate 86. Assume also that flip-flops 72 and 72*a* are in a reset condition and flip-flop 82 is in a reset condition. i(It will be shown shortly that the former assumption is valid as, when the previous Bell code was sensed, HK2 changed to 1 and acted as a reset signal for flip-flops 72 and 72*a*. However, DLC3, may set or reset flip-flop 82.) As B12–1 and B22–1 both are 1, six inputs to AND gate 86 represent ones so that flip-flop 72*a* becomes set.

At this point, a brief discussion is in order of the way in which the signal HK2 is generated. A more detailed discussion will be given later in connection with FIG. 5. The signal HK2=1 is produced by circuits 158, 160, 161 when the Bell code is stored in the registers 150—152 (FIG. 5). At this time, the data corresponding to the row of characters identified by the Bell code is located entirely in the shift register 80 (FIG. 4) so that the HK2 signal may reset the flip-flops 82, 72, 72*a*, etc. without causing any data to be lost. However, when the data stored in the register 150—152 and in the register 80 starts flowing back into the memory, HK2 changes to 0 and this removes the reset signal from the flip-flops.

Some time after the data starts back into the delay line memory, the data for the following row of characters begins to emerge from the delay line. At this time one of the flip-flops 72 or 72*a* will become set depending on the exact time this data starts coming from the delay line memory. The one of these flip-flops which gets set will remain set until the Bell code (whose first two bits caused the one of the two flip-flops 72 and 72*a* to become set) appears in the register 150—152. When this occurs HK2 will again change to 1 and will again reset the flip-flops 82, 72, 72*a* and so on, since the entire block of data for this row of characters is, at this time, stored in the registers 80. It is necessary to clear these flip-flops of all previous information so that they will be ready again to accept the next block of data when it emerges from the delay line memory.

Returning now to the previous discussion, it was stated that as B12-1 and B22-1 both were 1, flip-flop 72a became set. It may also be assumed that DLC2A-P and ESTS-2 both represent 1 so that AND gate 88 is enabled and flip-flop 72 becomes set. When flip-flop 72 becomes set, ST32-O changes its value to 0 and this disables the input AND gate 86 to flip-flop 72a. Thereafter, for the remaining time during which the row of characters following the Bell code will be read out of the memory, flip-flop 72a will remain set. The 1 output CON22-1 of this flip-flop serves as a priming signal to AND gates 90 and 92 in FIG. 4a. On the other hand, the 0 output present at CON22-0 disables AND gates 94 and 96.

Assume now that during the second bit time when stages 70 and 70a are both storing a 1, flip-flop 82 is set. In this case, the BA2-O signal represents a 0 so that AND gate 86 is disabled. However, the 1's present at B22-1 and at B12-1 enable AND gate 88 and this sets flip-flop 72. The set flip-flop disables AND gate 86 so that it is no longer possible to set the flip-flop 72 during the following bit times when flip-flop 82 again becomes reset. Now AND gates 90 and 92 of FIG. 4a are disabled, whereas AND gates 96 and 94 are primed. As will be shown shortly, under this set of circumstances, the two bits B22-1 and B32-1 are read from the three-bit register 75 into the 256-bit shift register 80 beginning at the third bit time, whereas if the flip-flop 72a is set, the bits B12-1 and B22-1 are read into the shift register 80 beginning at the second bit time.

The shifting of information into the shift register 80 is controlled by the bit alternator flip-flop 82 of FIG. 3. Each time the bit alternator flip-flop 82 is reset, BA2-1 the input signal to inverter 100 of FIG. 4a represents a 0, and the inverter applies a priming signal to AND gates 102, 104, 106 and 108 of FIGS. 4a and 4b. The second input to these AND gates is the output ST22-1 of flip-flop 110. It may be assumed for the present that this flip-flop is set. If the information in stages 70 and 70a is being read out of the register 75 because flip-flop 72a was set earlier, this information is present at the input to the shift register 80 when the bit alternator flip-flop 82 is reset. On the other hand, if during the period stages 70 and 70a are being sensed the flip-flop 82 is set, the information will not begin shifting into the shift register 80 until the following DLC3 pulse when flip-flop 82 becomes reset. This means, therefore, that data is taken from the flip-flops 70 and 70a only every bit time and causes the odd numbered bits (B22-1) to go into SR 80a and the even numbered bits (B12-1) to go into 80c.

If on the other hand the information in stages 70a and 70b of register 75 is being applied to the input terminals of shift register 80 because flip-flop 72a was not set earlier (CON22-O represents a 1), then when BA2-1 becomes 0 and the data is shifted into the shift register 80, the odd numbered bits (B32-1) of the bit stream are at the input to shift register 80a and the even numbered bits (B22-1) are at the input to shift register 80c.

Referring now to FIGS. 4a and 4b, assume that CON22-1 represents a 1, priming AND gates 90 and 92. The signal TER210-N occurs each time data is suppose to be coming out of the memory. Each time TER210-N=1 occurs, a second priming signal is applied to AND gates 90 and 92. If during this time the bit B12-1 represents a 1, AND gate 92 becomes enabled and this enables OR gate 22 and OR gate 22 applies a positive pulse to inverter 112. The inverter, in turn, applies a negative pulse representing a 1 to shift register 80c.

If during the same period, that is, the period during which TER210-N represents a 1, the bit B22-1 represents a 1, AND gate 90 becomes enabled and this enables OR gate 114. The OR gate causes inverter 116 to apply a negative-going pulse representing a 1 to shift register 80a. Thus two of the bits present in the register 75 of FIG. 3 are applied in parallel to the shift register 80a, 80c.

If flip-flop 72a of FIG. 3 is reset rather than set, its output CON22-O primes AND gates 96 and 94. In this event, the output B22-1 and B32-1 of register 75 are applied in parallel to the inputs to shift registers 80a and 80c, respectively.

The 2 bit in parallel information applied to the shift register is shifted through the register by trigger pulses derived from the output BA2-1 of the bit alternator flip-flop 82 of FIG. 3. Each time this bit represents a 0, (it does this for about 1.25 microseconds each 2.5 microseconds, that is, once each two bit times), inverter 100 applies a priming signal to AND gate 102 (FIG. 4a). During each 1.25 microsecond period this AND gate is primed, the control pulse DLC2 (see FIG. 7) occurs once. The third input to AND gate 102, namely input ST22-1P also represents a 1 so that AND gate 102 is enabled. The output of this AND gate is applied through OR gate 118 and inverter 120 to the trigger terminals Φ1 of the shift register, causing the information in the shift register to shift one stage forward. This shift pulse occurs once each two bit time.

It should be mentioned here that the shift register 80a—80d is a commercially available unit, each block consisting of 64 stages made up of metal oxide semiconductor (MOS) devices. These units are manufactured by General Instruments Corp. and may be identified by the part number MEM 3064. The information present in the shift registers may be shifted from stage to stage by a four-phase clock signal applied to the four trigger terminals of the register legended Φ1, Φ2, Φ3 and Φ4, respectively.

It has been shown already how the "low speed" phase 1 shift pulses are derived from the timing pulse DLC2 and the output BA2-1 of the bit alternator flip-flop. The successive phases of shift pulses are derived from the timing pulses DLC7, DLC1, and DLC6. The phase 2 pulses, for example, are obtained with AND gate 104, Or gate 122 and inverter 124. The phase 3 pulses are obtained with AND gate 106, OR gate 126 and inverter 128. The phase 4 shift pulses are obtained with AND gate 108, OR gate 130 and inverter 132. Each such shift pulse occurs once each two bit times.

The shifting of information into the shift register 80 continues for somewhat more than 5 scan line periods. By that time the shift register should be full, that is, it should be loaded with 32 characters. Now there is a pause as shown in FIG. 2 for approximately a half a scan line interval. This pause, during which no new information is shifted into the shift register 80 and no shift pulses are applied to the shift register 80 is obtained in the following way.

As information is being shifted into the shift register 80, the old information is being shifted from the shift register and back into the delay line. This old information, (DA210A-P and DA210B-P) is applied to the two registers 150 and 152 (FIG. 5). Register 150 consists of four stages 150a—150d and register 152 consists of four stages 152a—152d. Each pair of input bits is shifted through the registers 150 and 152 by shift pulses produced by AND gate 154 and inverter 156. One such shift pulse is obtained each two bit times just as in the case of the multiple-phase shift pulses for register 80. Each shift pulse occurs during the time the output BA2-0P of flip-flop 82 (FIG. 3) primes AND gate 154. During these periods ST22-1P, the output of flip-flop 110 (FIG. 4b) is a 1 and, for a short interval within this period, the pulse DLC2-P becomes a 1 (see FIG. 7).

After all 32 of the old characters have been shifted out of the register 80, the next character is the Bell code, 00000111 which indicates that a new row of characters is present in shift register 80. This Bell code is now stored as DSR12-1P=1, DSR22-1P1, DSR32-1P=1 and the remaining bits in registers 150—152 are all 0. This condition is detected by the Bell code decoder which consists of AND gate 158, OR gate 160 and inverter 161 (lower right of FIG. 5). Note that this gate receives four of the inputs above, namely DSR12-1P, DSR32-1P, DSR52-1N and DSR82-1N. The fifth input DSRD2-P is the one produced by the portion of the Cursor Code Decoder which consists of AND gate 162 followed by inverter 163 (left side of FIG. 5). The input to this portion of the decoder consists of the remaining four bits of the register, namely DSR72-1N, DSR62-1N, DSR42-1N and DSR22-1P. Thus, the output DSRD2-P of the decoder 162, 163 together with the remaining four DSR inputs to AND gate 158 define the storage of the code 00000111, which is the Bell code including the parity bit of this code.

At the time the Bell code is applied to AND gate 158, ST12-0P, one of the outputs of flip-flop 164 (FIG. 4b), represents a 1 and ST22-1P an output of flip-flop 110 (FIG.

4*b*), also represents a 1. Accordingly, the decoder 158, 160, 161 produces an output HK2–N, representing a 1.

The signal HK2–N above is applied as a reset signal to flip-flop 82 and the reset flip-flop 82 applies a signal BA2–P to inverter 100 of FIG. 4*a* in a polarity to disable the AND gates 102, 104, 106 and 108. Accordingly, the slow speed shift pulses are no longer produced and the 32 data words stored in the shift register 80 remain there for the "pause" of roughly one-half of a horizontal scan line interval, as mentioned above.

At the same time that the above is occurring, the BA2–0P output of the reset flip-flop 82 of FIG. 2 disables the shift AND gate 154 of the registers 150, 152 (FIG. 5). Therefore, the Bell code for the 32 characters stored in register 80 cannot be shifted out of registers 150 and 152 and remains stored in these registers.

Following the pause, the control signal TER210–P (FIG. 8) is generated by stages 221 and 223 or 222 and 223 (FIG. 5) in response to the control signals LQ2 and LQ1. Note that AND gate 221 produces an output when LQ2–0N and LQ2–1N are both positive-going, that is, they both represent binary 0 and gate 222 produces an output when signals LQ2–1N and LQ1–0N are both positive-going, that is, they both represent a 0. In other words, the gates 221 and 222 implement the EXCLUSIVE OR function for the signals LQ1–1N and LQ2–1N. The LQ signals are produced in the master timing generator in the control area of the system.

As will be shown shortly, the purpose of signal TER210–N produced by inverter 225 (FIG. 5) is to signal the memory system that it is indeed time to start the transfer of data from the register 80 and the registers 150 and 152 back into the delay line and that it is time to prepare to receive data from the delay line. The signal TER210–N goes negative each time the signal TER210–P is positive.

Figure 8:
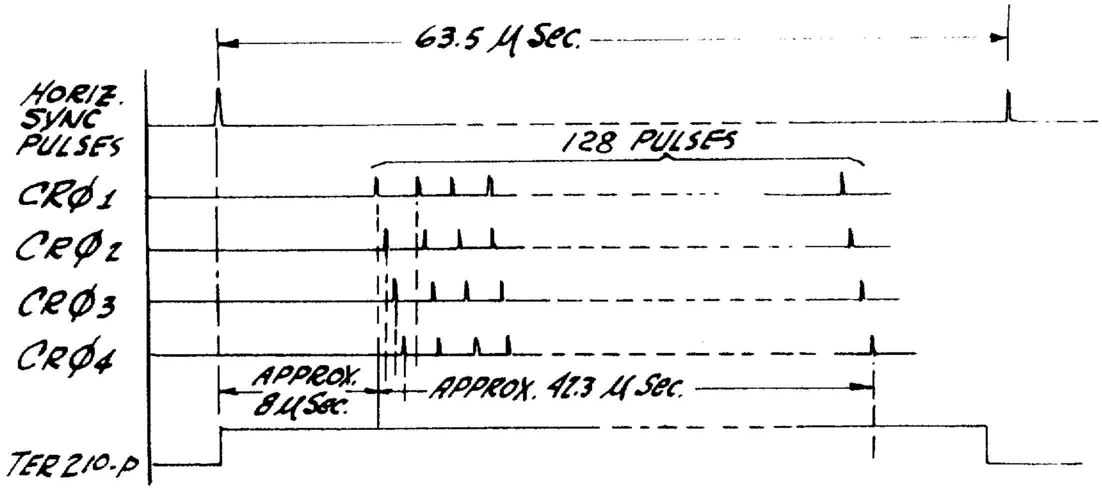

When the signal TER210–P is generated, this primes AND gates 134, 136, 138 and 140 (FIGS. 4*a* and 4*b*). At the same time ST22–1P represents a 0 so that AND gates 102, 104, 106 and 108 (FIG. 4) are disabled. The pulses CRΦ1 through CRΦ4 are multiple-phase high frequency shift pulses which are generated during an approximately 42.3 microsecond period starting roughly 8 microseconds after the start of TER210–P (see FIG. 8). Exactly 256 shift pulses (64 in each phase) are generated for shifting the 64 bits of a register stage such as 80*a*. Thus, a total of 4 sets of 128 shift pulses are produced as shown in FIG. 8 and when these shift pulses are applied to the shift register they shift the information stored therein at a rate of 6.041958/2 megahertz, that is, 6.041958/2 bits per second. Since the respective halves 80*a*—80*b* and 80*c*—80*d* of the register are effectively in parallel, the effective bit rate is 6.041958 megahertz so that it is possible to shift all of the information through the shift register in 42.3 microseconds, a period within the 63.5 microsecond scan line interval.

When TER210–P has the value 1 (is relatively positive), the output AND gates 142 and 144 (FIG. 4*b*) of the register 80 are primed. The other inputs to these AND gates, ER210–N and TE–N, may also be assumed to represent the bit 1 during this period. Therefore, the information present in the registers is applied through inverters 146 and 148 and AND gates 142 and 144 to the input OR gates 114 and 22, respectively, of the registers. This information therefore circulates around the register once.

During the time the row of information is being circulated at high speed around the register, this same information is supplied to one of the character generators of FIG. 1. The 32 characters for the row of information subsequently remain in this character generator for 14 television scan lines to permit this information to be converted to video information and to be displayed on the television screen, as already mentioned briefly.

The character generator in itself, may be one of a number of known generators. It may include, for example, a memory and a decoder. One suitable form of generator is described, for example, in copending application for "DISPLAY SYSTEMS," Ser. No. 536,852, filed March 23, 1966, by Robert John Clark and assigned to the same assignee as the present application.

While FIG. 1 shows two character generators, one for each display, it is possible instead to use a single character generator of the type described in the Clark application for both television displays. In an arrangement of this type, the character generator is capable of simultaneously generating all of the characters which are needed. However, each television display D1 and D2 would then employ a separate gating network to permit the selection for each display of the particular characters desired.

Figure 7:
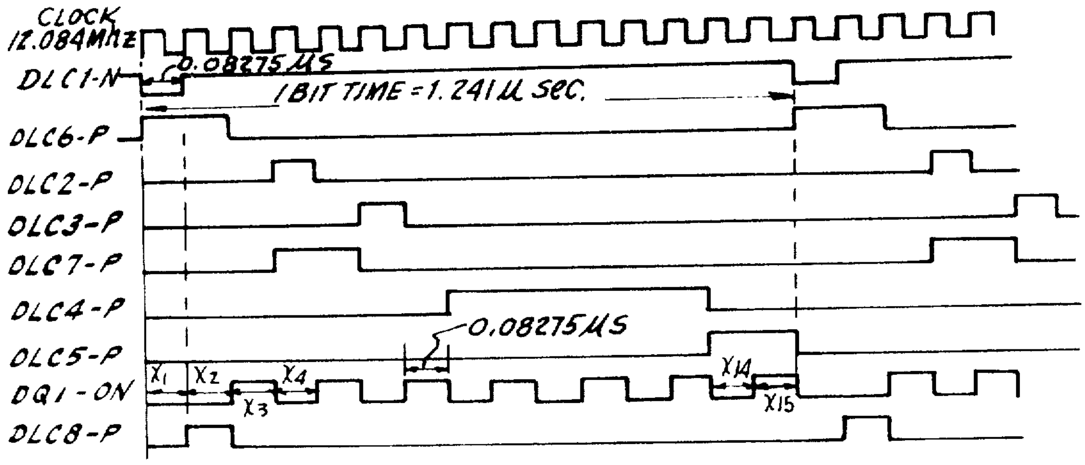
FIGS. 7 and 8 are drawings of waveforms to help explain the operation of other of the circuits of the preceding figures.

After the horizontal scan line period above, during which the information present in the shift register 80 (FIG. 4) is circulated once through the shift register, the signals TER210–N and WHS–1 go positive. The way in which signal TER210–N is generated has already been discussed and its complementary signal TER210–P is shown in FIG. 8. The signal WHS–1 occurs once each row, at the end of the first horizontal scan line of that row. These two signals prime AND gate 180 (upper right of FIG. 4*b*). Now, when the timing pulse DLC1–P occurs (this is a pulse that goes positive once each bit time and its complement DLC1–N produced by inverter 227 is shown in FIG. 7) AND gate 180 becomes enabled and flip-flop 164 becomes set. This causes ST12–0 to change its value to 0 and the AND gate 158 (FIG. 5) of the Bell code decoder becomes disabled. HK2 therefore, changes to 0.

When flip-flop 164 becomes set, the output ST12–0 goes relatively negative so that OR gate 184 produces an output STX=1. This serves as a priming signal for AND gate 84 of FIG. 3. Thereafter, each time the pulse DLC3 occurs, AND gate 84 becomes enabled and flip-flop 82 changes its state.

The output BA2–1 of flip-flop 82 now changes its value once each bit time and, as ST22–1P represents a 1, the AND gates 102, 104, 106 and 108 again begin producing the relatively slow speed multiple-phase shift pulses which are applied to the shift register 80. (Note that ST22–1 changes to 1 shortly after flip-flop 164 becomes set. This occurs because the set flip-flop 164 primes AND gate 186 and the pulse DLC5 shortly thereafter enables this AND gate and causes it to set flip-flop 110.) The two-bits-in-parallel information shifted out of the shift register 80 flows through inverters 146 and 148 to the parallel shift registers 150 and 152, respectively of FIG. 5. The two-bits-in-parallel are shifted through these two registers by the output of AND gate 154 and inverter 156 in the same way that the Bell code was shifted into this register, as already described. In brief, every two bit times, BA2–0P changes to 1 and as ST22–1P is also a 1, AND gate 154 is enabled each time DLC2–P changes to 1 (see FIG. 7).

The two-bits-in-parallel output of shift registers 150 and 152 are converted to serial form by the two AND gates 190 and 18, respectively. During one bit time, BA2–1P is a 1 priming AND gate 190 and during the immediately following bit time BA2–0P is a 1 priming AND gate 188. During a restricted interval (0.08275 microseconds) within each bit time, the pulse DLS2=1 occurs, enabling the one of AND gates 190 and 188 which happens to be primed. This enabled AND gate applies the information present in the last stage of its register (either stage 152*d* or stage 150*d*) through OR gate 192 to the write circuits 36 (FIG. 1) at the input to the delay line memory 24. This information is legended DL2I–P in FIG. 5.

When the writing of data is completed, the signals ER210–N and DLCB1–P (upper right of FIG. 4*b*) go positive and AND gate 181*a* thereupon resets flip-flop 164. As an alternative, the flip-flop 164 may be reset via gate 181*b*. The reset pulses DLCB1–P and DLCB7–P are produced at other portions (not shown) of the complete system but at a place corresponding to that at which the analogous signal DLCB2–P is generated by inverter 276 (right center of FIG. 4*b*). The DLCB1–P and DLCB7–P signals are chosen because they happen to occur at the right time to perform the reset function, that is, approximately 5 1/6 television scan lines after the flip-flop 64 is set. Flip-flop 110 subsequently is reset when the Bell code is detected as being stored in the registers 150, 152 (FIG. 5). At this time, the signal Hk2–N goes negative and this resets stage 72 (FIG. 3) changing ST32–0 to a 1. Now when DLC5–P changes to 1, AND gate 183 is enabled and it resets flip-flop 110.

In the earlier part of the present discussion, it was explained at length how a delay of one bit period can be achieved in the read out of the three-bit register 75 of FIG. 3. However, the reason for doing this was not discussed and this will be covered here.

Assume first that the data bits arriving from the delay line are identified as A B C D E and so on and that they arrive in this sequence, that is, first the A bit, second the B bit and so on. These bits pass into the register 75 and then into the register 80 (FIGS. 4 and 5) and then into the registers 150 and 152 (FIG. 5). If the stages 70 and 70*a* are selected, the bit in stage 70*a*, that is, bit B22-1 will eventually be stored in stage 150*d* of the register 152 as bit DSR-12 and the bit B12-1 will be stored in stage 150*d* of register 150 as bit DSR22-1P. If the stages 70*a* and 70*b* are selected, the bit B32-1 will be stored in the last stage of register 152 as DSR-12 and the bit B22-1 will be stored in the last stage of register 150 as bit DSR22-1P.

If there were no control, any one of the following four conditions could occur in the process of shifting the information from register 75 through the registers 80 and through the registers 150 and 152.

I. The first bit A could arrive at the second stage 70*a* at register 75 when the other shift registers 80, 150 and 152 were not being shifted. At the next clock phase, the data bits B12-1 and B22-1 would be shifted into the shift registers 80*c* and 80*a*, respectively. In due course, these bits and the ones following them would reach the end of registers 150 and 152 and would be stored as:

DSR-12=A
DSR-22=B
DSR-32=C
DSR-42=D

II. The first bit A could arrive at the first stage 70 of the register 75 at a clock phase when the other shift registers were not being shifted. In the next clock phase, the data from the first two stages 70*a* and 70 would be shifted into the other shift registers. When the data finally arrived at the end of registers 150 and 152, the bits stored would be:

DSR-12=zero
DSR-22=A
DSR-32=B
DSR-42=C
DSR-52=D

III. The same thing could occur as discussed under example I above with the two bits being taken from the last two stages 70*a* and 70*b* of register 75. The final result in this case would be:

DSR-12=zero
DSR-22=A
DSR-32=B
DSR-42=C
DSR-52=D

IV. The same condition as II could occur with the two bits being taken from the last two stages of the three-bit shift register. In this case, the final result would be:

DSR-12=A
DSR-22=B
DSR-32=C
DSR-42=D

If a decoder were connected to the registers 150 and 152 to recognize when the bits A and B arrived at the last stages 152*d* and 150*d* of registers 152 and 150, the storage states depicted under examples II and III would not be recognized. Further, it is clear that these two examples II and III represent improper system operation since the final stage of register 152, rather than storing an information bit, is storing nothing, hat is, while a bit should be present in stage 152*d*, it is not.

Flip-flops 72 and 72*a* prevent the improper operation depicted in examples II and III from occurring. They select automatically the two of the three stages of register 75 which are actually storing bits and once a selection is made, the remaining bits of the block of data must be read out properly. The selection is made at the beginning of each block of data so that each row of characters is properly synchronized with the sweep of the television display.

In the discussion of FIG. 3, the signals ER210 applied to gates 10 and 50 are mentioned. This signal is an erase signal that prevents the data output of memory from passing through gate 10 to the shift register 500. The gate 10 is disabled when the signal ER210-N is negative. This signal goes negative when either flip-flop 201 or 202 (lower part of FIG. 5) is set at the time data for one of the two displays associated with the delay line memory is to be read from the memory. Note, for example, that when flip-flop 201 is set and the signal LQ2-0N represents a 1, AND gate 230 is enabled and this enables OR gate 231 so that inverter 232 produces a negative-going signal ER210-N. In a similar manner, if flip-flop 202 is set and the control signal LQ2-1N is relatively positive, AND gate 233 is enabled and the signal ER210-N goes negative.

The flip-flops 201 and 202 may be set for a period extending from some row of characters to the bottom of the page being displayed or for a period equivalent to that of a full page. The signal E-P applied to prime the input AND gates 204 and 206 of flip-flops 201 and 202, respectively, is derived in the control area of the system. Note that when AND gate 221 is enabled, inverter 234 applies a positive-going signal to AND gate 204 and when AND gate 22 is enabled, inverter 235 applies a positive-going signal to AND gate 206.

When he signal ER210-N becomes relatively negative, a number of different things occur. The signal is applied to gates 142 and 144 (FIG. 4*b*) at the output of the shift register 80 and this prevents this information from being reinserted into the register 80. The signal ER210-N also disables AND gate 10 at the upper left of FIG. 3. This is the AND gate through which the bits stored in the delay line pass when they are placed in the register 500. If AND gate 10 is disabled and AND gate 50 is also disabled, each time the shift pulse DQ-1 occurs, a 0 is placed in the register 500 and if these gates are maintained disabled for a sufficient period as many rows of stored information as desired can be erased.

It is also possible for gate 50 to be enabled when gate 10 is disabled (FIG. 3). This permits new information to be inserted into the register 500 and subsequently into the delay line memory through the input gate 50. At the beginning of each write cycle, for example, flip-flop 164 (FIG. 4*b*) is set so that the input ST12-1 to gate 50 is a 1. Flip-flop 72 is reset so ST32-0 is a 1. Therefore, in response to the successive shift pulses DQ-1, a succession of 1's are supplied to the register 500. When three 1's fill up the shift registers 70, 70*a*, 70*b*, flip-flop 72 becomes set so that ST32-0 goes negative (represents a 0) and AND gate 50 is disabled. Thereafter, zeros are shifted into register 500. The three 1's in registers 70, 70*a*, 70*b* followed by zeros is the Bell code and it is subsequently shifted through the register 80 and into the registers 150, 152. There the Bell code is recognized (circuits 158, 160, 161) and is used to stop the cycle just as in the normal write operation. Thus any possible loss in synchronization automatically is prevented by the insertion of this code.

The above process repeats until the signal R17-P, which corresponds to what would be the 17th row of characters, is generated. This signal is applied to AND gates 250 and 251 causing these gates to reset the flip-flops 201 and 202 and in this way to terminate the erase cycle.

The output of AND gate 251 also serves as a set signal for flip-flop 252. The output of this flip-flop DLB2-0P serves as a disabling input to AND gate 10, upper left of FIG. 3. The purpose of this signal is to block the output of the delay line during the vertical retrace interval. upon termination of the vertical retrace interval, the signal BOP-P is generated which enables AND gate 253 and the latter resets flip-flop 252.

Whenever desired, computer originated data may be placed in the delay line memory and this is done via the gates 274 and 275 of FIG. 4*a*.

Gates 260 and 261 of FIG. 4*b* generate the strobe signals DLS2-P to transfer data from the registers 150, 152 (FIG. 5) into the delay line. These pulses occur when data is being rewritten and are inhibited when the keyboard data is replacing one of the Cursor Codes in the memory. The signals DLS2-P go to gates 188 and 190 of FIG. 5. DLC-0N applied to gate 260 of FIG. 4b is the strobe pulse used to produce this signal and it is also applied to gate 270 (FIG. 5) as the keyboard data entry strobe. (Gate 270 and the other gates associated with it are discussed in more detail later.)

KEYBOARD DATA INSERTION CIRCUITS

In the use of the system of the present invention for instructional purposes, it is sometimes desirable for the student to insert data into the display. For example, in the case in which the material being displayed is a lesson plan, there may be questions at the end of the lesson which the student must answer. He answers these questions by depressing keys on the keyboard within block 38 of FIG. 1 and this causes these characters both to be displayed and to be sent back to the computer within block 38 of FIG. 1.

In those places in which it is desired that the student enter data, the television receiver displays a special so-called "Cursor Code" symbol. This symbol is stored in the delay line as binary octal 22, that is 10 010 010, where the leftmost 1 is the parity bit.

If a Cursor Code is present in a row of characters, when that row is shifted out of the shift register 80, it passes through shift registers 150 and 152. The Cursor Code, when present in registers 150 and 152 is sensed by the Cursor Code decoder which consists of AND gate 162, inverter 163 and AND gate 200, all in DLC1-P 5. The additional signal KBDR-P applied to decoder gate 200 indicates that a character has been received from DLC1-P keyboard. If this signal represents a DLC3-P, 1 and if BC02-P, discussed later, also is a 1 at the time the Cursor Code is present in the registers 150, 152, then flip-flop 240 becomes set, AND gate 241 becomes enabled and KBR2-N goes negative. KBR2-N is the signal sent to the keyboard data receiver to indicate that data is being entered into the terminal memory and should be removed from its memory register. The data from the keyboard (character code) is then brought into the logic stages of the present system and inserted in place of the Cursor Code. BC02-P then resets flip-flop 240, the next time DLC1-P occurs, by means of AND gate 242. This occurs one character time after flip-flop 240 is set because DLC1-P occurs in a bit time before DLC3-P, the strobe on the set signal for flip-flop 240.

In a single delay line there is data for two student terminals. Therefore, there are also Cursor Codes for both terminals. In the present system the data received from the terminal keyboard goes into the first data locations from the top of the page for that terminal where a Cursor Code is presently stored in it. More than one Cursor Code may be in a terminal's memory at one time.

Gates 262, 263, and 264 of FIG. 5 separate the search for the first Cursor Code for the two terminals so that data for one of the terminals goes into its area of the delay line memory and data for the other terminal goes into the other area of the delay line memory.

When flip-flop 240 of FIG. 5 is set, the keyboard data entry is enabled through gate 270, as EKBEZ-1P has the value 1. DDR1 is the character code data signal that is to be entered. It goes into the memory serially via gates 268, 269 and 270.

In the present system, there are two modes of operation. In one, each character code has a parity bit and each code is checked by the character generator. If bad parity exists, a special symbol is generated in place of that defined by the character code. In the other mode, the parity bit is replaced by an underline bit. This bit, when a one, causes the character generator to draw a line under the character specified. US-P one of the inputs to gate 265, is the control signal specifying which mode the system is in. When in the parity bit mode, this signal is a zero and therefore all bits of the character code DDR1-1P go into the memory. When in the underline mode, US-P is a one and at BC02-P (the bit time for the parity bit to be going into the memory, the output of gate 265 inhibits gate 268 and through inverter 266 enables gate 267 to enter the underline data, DSR27-1P into the memory via gates 267, 269 and 270.

As the actual circuits for inserting characters from a keyboard into delay line memory are in themselves known and not part of the invention being claimed, they need not be described in detail here. Typical circuits of this type are shown, for example, in Durr U.S. Pat. No. 3,307,156, dated Feb. 28, 1967.

The circuit for producing the BC02-P signal discussed above is shown in FIG. 3. It is merely a three-stage counter comprising flip-flops 82, 210, and 212 followed by a recognition gate 245 and inverter 246. The signal BC02-P is produced each time eight successive pulses are counted. The signal BC02-P may be considered a character synchronization pulse and it indicates when the bits in the shift registers 150, 152 may be examined to see if a Cursor Code happens to be present. If these registers 150, 152 were sensed at any other time, an erroneous signal might be obtained from the end bits of one character code and the beginning bits of the next character code in sequence.

Another feature of the present system is its ability to receive and recognize the data from the terminal keyboard. Since the actual time a student will depress a key is unpredictable, some correlation of signals must be accomplished. In the present system the data is sent from the keyboard at the first vertical retrace time following the depressing of the key and is timed by sending one data bit each television horizontal line time. The signal ESTS-2 (FIG. 5, lower right) enables the generation of the keyboard data receiver strobe pulses for these terminals. This signal is generated by gates 271, 272 and 273 at the lower right of FIG. 5.

What I claim is:

1. In combination:

a source of timing pulses;

a display system whose timing is independent of any signals stored in the circulating delay line memory set forth below connected to and operating synchronously with said source;

a circulating delay line memory subject to drift coupled to said display system for delivering binary coded sequential signals a bit at a time representing the information to be displayed by said system, but which signals, because of drift of said memory, may not be in proper phase relationship with the operation of said display system;

means controlled by said source of timing pulses receptive of said sequential signals from said memory for deriving therefrom signals in a desired phase relationship with the operation of said display system; and means receptive of said sequential signals for returning them a bit at a time to said circulating delay line memory in a predetermined fixed phase relationship with the operation of said display system.

2. In the combination set forth in claim 1, said display system comprising a television receiver.

3. In combination:

a stable frequency source;

a television receiver which derives its timing waveforms solely from said stable frequency source;

a refresh delay line memory subject to drift for supplying a bit at a time the binary coded signals from which are derived the intensity modulation signals for creating and continuously refreshing the display of said television receiver;

means controlled by said stable frequency source and receptive of the signals provided by said delay line memory for deriving therefrom signals which are synchronous with the timing waveforms of said television receiver; and means for returning to said delay line memory said synchronous signals a bit at a time such that they begin again to be supplied by said memory approximately one television field time later.

4. In combination:

$n$ television receivers.

a refresh delay line memory.

means for storing in said delay line memory for each receiver $p$ groups of signals, each group corresponding to $m$ television lines, and also a blank space of a duration corresponding to at least the television vertical retrace period, where the $p$ groups plus the blank space contain sufficient information for one television field but occupy not more than $1/n^{th}$ of a television field time, and where the groups of signals for the respective receivers are stored in interlaced fashion so that the delay line memory supplies first a group of signals for one receiver then a group of signals for another receiver and so on, means responsive to each group of signals for translating said signals to intensity modulation signals which are synchronous with the timing of the corresponding television receiver and for applying them to said receiver, and means for returning each group of signals to said delay line memory at a time such that it is again produced by said delay line memory approximately one television field time later, where $m$, $n$ and $p$ are all integers greater than 1.

5. In the combination set forth in claim 4, said refresh delay line memory having a delay equal to approximately one television field time.

6. In the combination set forth in claim 4, further including a stable frequency source connected to said $n$ television receivers for synchronously controlling the operation of all of said receivers.

7. In combination:

a stable frequency source;

display means which derives its timing waveforms from said stable frequency source independently of the circulating memory set forth below and which has a screen on which an image created by successive fields are displayed;

a circulating delay line memory subject to drift for supplying a bit at a time binary coded signals from which are derived the modulation signals for creating and continuously refreshing the image on the screen of said display means;

means controlled by said stable frequency source and receptive of the signals provided by said circulating memory for deriving therefrom signals which are synchronous with the timing waveforms of said display means; and means for returning to said circulating delay line memory said synchronous signals a bit at a time, at a time such that they begin again to be supplied by said memory approximately one display means field time later.

8. In combination:

display means operating at a given rate, video generator means which accepts sequential input signals a bit at a time for a short interval at a rate substantially higher than said given rate and which converts them to video signals and supplies said video signals to said display means over an interval substantially longer than said short interval;

refresh delay line memory means for supplying the sequential signals to be converted to video signals a bit at a time and at a rate substantially lower than that at which the video generator accepts signals; and means receptive of the signals supplied by said refresh memory means for supplying them a bit at a time to said video generator means at said substantially higher rate.

9. In the combination set forth in claim 8, said last-named means comprising a shift register, means for shifting said register at the operating rate of said refresh memory means during the interval said register receives signals therefrom, and means for shifting said register at said higher rate of said video generator means while supplying said signals to the latter.

10. In the combination set forth in claim 8, further including means for returning said signals supplied by said memory means to said memory means at the operating rate of said memory means.

11. In combination:

display means operating at a given rate;

video generator means which accepts input signals for a short interval at a rate substantially higher than said given rate and which converts them to video signals and supplies said video signals to said display means over an interval substantially longer than said given rate;

refresh memory means for supplying the signals to be converted to video signals at a rate substantially lower than that at which the video generator accepts signals;

shift register means receptive of the signals supplied by said refresh memory means for supplying them to said video generator means at said substantially higher rate, means for shifting said shift register means at the operating rate of said refresh memory means during the interval said shift register means receives signals therefrom, and means for shifting said shift register means at said higher rate of said video generator means while supplying said signals to the latter; and means for ring shifting said shift register means while applying its contents to said video generator to thereby retain said signals in said shift register means, and means for then opening said ring and shifting said signals out of said shift register means and back into said memory means at the operating rate of said memory means.

12. In the combination set forth in claim 11, further including means for applying signals from said refresh memory means to said shift register means during the time the signals from said shift register means are being applied to said memory means.

13. The combination of:

a delay line memory storing in coded form the fields for two television displays with signals for groups of scan lines for one display interlaced with signals for groups of scan lines for the other display;

register means;

means for loading said register means with the signals for one group of horizontal scan lines and for then ring shifting said signals once around said register within a period substantially shorter than that required to load said register means from said memory;

video generator means receptive of said signals stored in said register means as they are being ring shifted for applying video signals to one display for a period substantially longer than that required to receive the corresponding coded signals from said delay line memory; and means for concurrently loading said register means with the signals for a group of scan lines for the other display while returning the signals stored in said register means to said delay line memory.

14. The combination set forth in claim 13, wherein the delay line memory is subject to drift and further including:

a stable frequency source, and means for synchronizing said signals produced by said delay line memory with said frequency source prior to loading them into said register means.

15. In combination:

a television receiver for displaying two interlaced fields per frame;

a delay line memory for storing coded signals for a single field for said receiver, translating means coupled to said delay line memory for translating said coded signals to video signals and for applying said video signals to said television receiver for effecting the display of one field of information on said receiver; and means for returning said coded signals to said delay line memory at a time such that they begin again to emerge from said memory in time for said translating means to produce the second field of a frame and to apply it to said receiver interlaced with said first field.

16. The combination set forth in claim 15, in which said delay line memory stores interlaced with said single field for said receiver, a second field of coded signals, this one for a second television receiver, a second television receiver; and a second translating mean and second means for returning, both as set forth in claim 15, for together deriving from said second field of coded signals two interlaced fields of a frame for said second television receiver.